(12) United States Patent
Hamada et al.

(10) Patent No.: US 8,991,359 B2
(45) Date of Patent: Mar. 31, 2015

(54) CAMSHAFT DEVICE

(75) Inventors: Kazuki Hamada, Kashiwara (JP);
Hiroshi Ueno, Tondabayashi (JP); Isao Usuki, Yamatotakada (JP); Hironori Hiraoka, Yao (JP)

(73) Assignee: JTEKT Corporation, Osaka-shi (JP)

( * ) Notice: Subject to any disclaimer, the term of this patent is extended or adjusted under 35 U.S.C. 154(b) by 179 days.

(21) Appl. No.: 13/819,576

(22) PCT Filed: Sep. 2, 2011

(86) PCT No.: PCT/JP2011/069980
§ 371 (c)(1),
(2), (4) Date: Feb. 27, 2013

(87) PCT Pub. No.: WO2012/029934
PCT Pub. Date: Mar. 8, 2012

(65) Prior Publication Data
US 2013/0239727 A1    Sep. 19, 2013

(30) Foreign Application Priority Data

Sep. 3, 2010   (JP) .................................. 2010-198015

(51) Int. Cl.
*F01L 1/047*    (2006.01)
*F01L 1/04*    (2006.01)
(Continued)

(52) U.S. Cl.
CPC ............... *F16H 25/14* (2013.01); *F01L 1/022* (2013.01); *F01L 1/047* (2013.01); *F01L 1/3442* (2013.01);
(Continued)

(58) Field of Classification Search
CPC ............... F01L 1/04; F01L 1/047; F01L 1/34; F01L 1/348; F01L 1/352; F01M 9/10; F01M 9/102

USPC ............ 123/321, 90.15, 90.17, 90.31, 90.33, 123/90.27, 90.34, 90.6
See application file for complete search history.

(56) References Cited

U.S. PATENT DOCUMENTS 7,707,983 B2 *   5/2010   Ueno et al. ................. 123/90.31
8,387,576 B2 *   3/2013   Iwata ......................... 123/90.17
(Continued)

FOREIGN PATENT DOCUMENTS

DE    3814544 A1    11/1989
EP    1 286 024 A2    2/2003
(Continued)

OTHER PUBLICATIONS

Aug. 25, 2014 Office Action issued in Japanese Application No. 2010-198015 (with translation).
(Continued)

*Primary Examiner* — Hieu T Vo
(74) *Attorney, Agent, or Firm* — Oliff PLC (57) ABSTRACT

An intake camshaft device 1 includes an intake camshaft, a first rolling bearing and a second rolling bearing for rotatably supporting both end parts of the intake camshaft, and a first sliding bearing and a second sliding bearing for rotatably supporting the intake camshaft between the first and second rolling bearings. The first rolling bearing is arranged in a same plane as a rotation plane of a sprocket for an intake cam. In other words, the first rolling bearing is positioned in a plane which is overlapped with a plurality of teeth of the sprocket for the intake cam, and perpendicular to a center axis. The first sliding bearing is disposed adjacent to the first rolling bearing backward in an axial direction.

3 Claims, 4 Drawing Sheets

(51) Int. Cl.
*F16H 25/14* (2006.01)
*F01L 1/02* (2006.01)
*F01L 1/344* (2006.01)
*F16C 41/00* (2006.01)
*F16C 21/00* (2006.01)
*F01M 9/10* (2006.01)

(52) U.S. Cl.
CPC ............... *F16C 41/005* (2013.01); *F16C 21/00* (2013.01); *F01L 2001/0476* (2013.01); *F01L 2001/34423* (2013.01)
USPC ..... 123/321; 123/90.6; 123/90.31; 123/90.17

(56) References Cited

U.S. PATENT DOCUMENTS

| | | |
|---|---|---|
| 2003/0029401 A1 | 2/2003 | Nishikawa |
| 2006/0236966 A1 | 10/2006 | Schafer et al. |
| 2008/0170816 A1 | 7/2008 | Ueno et al. |
| 2008/0210182 A1 | 9/2008 | Schaefer et al. |

FOREIGN PATENT DOCUMENTS

| | | | |
|---|---|---|---|
| EP | 2 065 603 A1 | 6/2009 | |
| JP | A-2000-220417 | 8/2000 | |
| JP | A-2003-106114 | 4/2003 | |
| JP | A-2003-120240 | 4/2003 | |
| JP | A-2006-250062 | 9/2006 | |
| JP | A-2006-300067 | 11/2006 | |
| JP | A-2007-527968 | 10/2007 | |
| JP | A-2009-19728 | 1/2009 | |
| JP | A-2009-236162 | 10/2009 | |
| JP | A-2011-27083 | 2/2011 | |
| JP | 2013068155 A * | 4/2013 | ................ F01L 1/04 |

OTHER PUBLICATIONS

Oct. 25, 2011 International Search Report issued in International Patent Application No. PCT/JP2011/069980 (with translation).

Dec. 5, 2014 Search Report issued in European Application No. 11821948.4.

* cited by examiner

FIG.4 ial direction thereof, has been conventionally known. A sprocket which a chain for transmitting a power to the camshaft is to be wound around is mounted on the camshaft.

CAMSHAFT DEVICE

TECHNICAL FIELD

The present invention relates to a camshaft device which includes a camshaft having a plurality of cams, and bearings for rotatably supporting this camshaft.

BACKGROUND ART

A camshaft which is provided with a plurality of cams for actuating an intake/exhaust valve of an engine for an automobile, in an axial direction thereof, has been conventionally known. A sprocket which a chain for transmitting a power to the camshaft is to be wound around is mounted on the camshaft.

The conventional camshaft is held having its outer peripheral face directly supported by a plurality of sliding bearings which are fixed in a housing of the engine (refer to, for example, Patent Document 1).

However, in this case, there is such a problem that a high torque is likely to occur in the camshaft, because rotation sliding resistance is increased due to sliding friction.

PRIOR ART DOCUMENT

Patent Document

Patent Document 1: JP-A-2000-220417

SUMMARY OF THE INVENTION

Problems that the Invention is to Solve

The inventors of this application are considering a structure of a camshaft device in which the sliding bearings are substituted with rolling bearings (deep groove ball bearings). By employing the rolling bearings, the rotation sliding resistance of the camshaft can be decreased, and therefore, it is possible to achieve a lower torque drive of the camshaft. However, in case where all the bearings for supporting the camshaft are substituted with the rolling bearings, there occurs such an anxiety that the structure may become complicated.

In view of the above, an object of the invention is to provide a camshaft device in which lower torque drive of a camshaft can be realized, without complicating the structure of the camshaft, and thus, fuel efficiency can be enhanced.

Means for Solving the Problems

An invention as claimed in claim 1 for attaining the above described object is a camshaft device comprising a camshaft (4) including a shaft body (7), and a plurality of cams (19A, 19B, 19C, 19D, 19E, 19F) which are provided along an axial direction of the shaft body, a gear (9) having a plurality of teeth (71), and mounted on the camshaft so as to rotate around a center axis (C) of the camshaft, and a plurality of bearings (15, 16, 17, 18) rotatably supporting the camshaft, wherein a transmitting member (6) transmitting a driving power is wound around the gear, the bearings include a roiling bearing (15) which is provided in a plane including the plurality of teeth and perpendicular to the center axis, and a sliding bearing (17) which is provided adjacent to the rolling bearing in the axial direction.

It is to be noted that numerals in the parenthesis represent corresponding constituent elements in a below described embodiment, but do not limit a scope of the claims to the embodiment. The same is applied to the following description in this column.

According to this structure, the camshaft is rotatably supported by the plurality of bearings including the rolling bearing, and the sliding bearing which is disposed adjacent to the rolling bearing in the axial direction. A load of the transmitting member which is wound around the gear is intensively exerted on a part of the camshaft in a plane including the plurality of teeth of the gear and perpendicular to the center axis of the camshaft. The rolling bearing is disposed in this part. The part of the camshaft which mainly bears the load of the transmitting member is supported by the rolling bearing which has smaller rotation sliding friction, and therefore, it is possible to achieve the lower torque drive of the camshaft device.

Moreover, the sliding bearing is disposed adjacent to the rolling bearing. Because the camshaft is supported by both the rolling bearing and the sliding bearing, the lower torque drive of the camshaft device can be more effectively achieved.

As the results, it is possible to realize the lower torque drive of the camshaft, without complicating the structure of the camshaft device. In this manner, improvement of fuel efficiency of an automobile can be achieved.

In case where a chain is employed as the transmitting member, it is possible to employ a sprocket as the gear.

An invention as described in claim 2 is the camshaft device as claimed in claim 1, wherein the camshaft device further includes a valve timing mechanism (11) of hydraulic type for varying phases of the gear and the camshaft, the gear further includes a peripheral wall part (32) in a cylindrical shape which is provided at an opposite side to the sliding bearing with respect to the rolling bearing, and concentric with the center axis, the plurality of teeth are provided on an end face of the peripheral wall part at one side in the axial direction, and the sliding bearing is formed with flow ports (47, 48) for supplying and discharging an oil to the valve timing mechanism through the shaft body, so as to pass through the sliding bearing in a radial direction.

According to this structure, the valve timing mechanism, the rolling bearing, and the sliding bearing are arranged in this order, along the axial direction of the shaft body. The oil from the flow ports of the sliding bearing is supplied and discharged to and from the valve timing mechanism through the shaft body. Because the sliding bearing is disposed adjacent to the rolling bearing, axial lengths of passages for the oil flow (50, 54) which are formed in the shaft body can be reduced.

An invention as described in claim 3 is the camshaft device as claimed in claim 2, wherein the camshaft device further includes a support member (41, 42) supporting both the rolling bearing and the sliding bearing, and the support member is formed with oil flow passages (43, 44) for supplying and discharging the oil to and from the valve timing mechanism through the shaft body and the oil flow ports.

According to this structure, because the single support member supports both the roiling bearing and the sliding bearing, it is possible to decrease the number of components for the support member.

MODE FOR CARRYING OUT THE INVENTION

Figure 1:
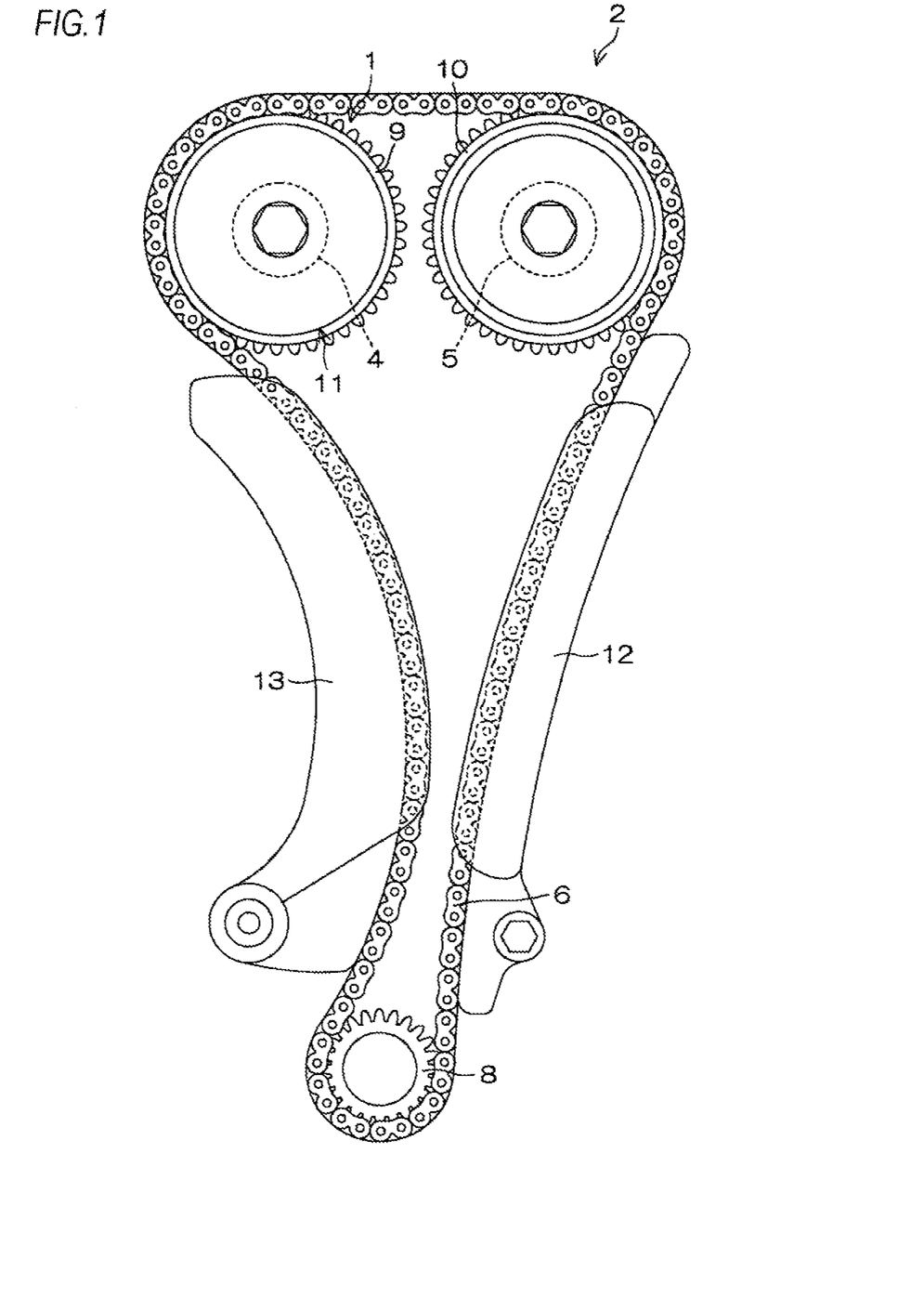
FIG. 1 is a side view showing a structure of a timing chain mechanism provided with an intake camshaft device, to which a camshaft device in an embodiment according to the invention is applied.

A mode for carrying out this invention will be described in detail, hereinbelow, referring to the attached drawings. FIG. 1 is a side view showing a structure of a timing chain mechanism 2 provided with an intake camshaft device 1, to which a camshaft device in an embodiment according to the invention is applied. The timing chain mechanism 2 includes a crankshaft (not shown), an intake camshaft (a camshaft) 4, an exhaust camshaft 5, and a timing chain 6 as a transmitting member for transmitting a power between these crankshaft, intake camshaft 4, and exhaust camshaft 5. This timing chain mechanism 2 is mounted in an engine for an automobile (not shown, but four cylinder in-line engine, for example), as an internal combustion engine.

A sprocket 8 for a crank is fixed to a distal end of (a frontward end in a direction perpendicular to a drawing, in FIG. 1) of the crankshaft. A sprocket (a gear) 9 for an intake cam is fixed to a distal end (a frontward end in the direction perpendicular to the drawing, in FIG. 1) of the intake camshaft 4. A sprocket (a gear) 10 for an exhaust cam is fixed to a distal end (a frontward end in the direction perpendicular to the drawing, in FIG. 1) of the exhaust camshaft 5. The single timing chain 6 is wound around these three sprockets 8, 9 and 10. In other words, the timing chain mechanism 2 is a single stage chain which drives the intake camshaft 4 and the exhaust camshaft 5 by means of the single timing chain 6.

When the crankshaft is driven to rotate, the timing chain 6 is rotated in a predetermined one direction (a clockwise direction, in FIG. 1), and at the same time, the intake camshaft 4 and the exhaust camshaft 5 are respectively rotated along with this rotation of the timing chain 6. The intake camshaft 4 is provided with a variable valve timing (hereinafter, referred to as "VVT") mechanism 11 for varying opening/closing timing (hereinafter, referred to as "valve timing") of an intake valve (not shown). Specifically, the VVT mechanism 11 varies a phase between the intake camshaft 4 and the sprocket 9 for the intake cam, using hydraulic pressure, thereby to change the opening/closing timing of the intake valve.

Moreover, the timing chain mechanism 2 includes a chain guide 12 which is in contact with a tensioned side of the timing chain 6, and a tension applying arm 13 which presses a slackened side of the timing chain 6 inwardly, for the purpose of applying a tension to the timing chain 6.

Figure 2:
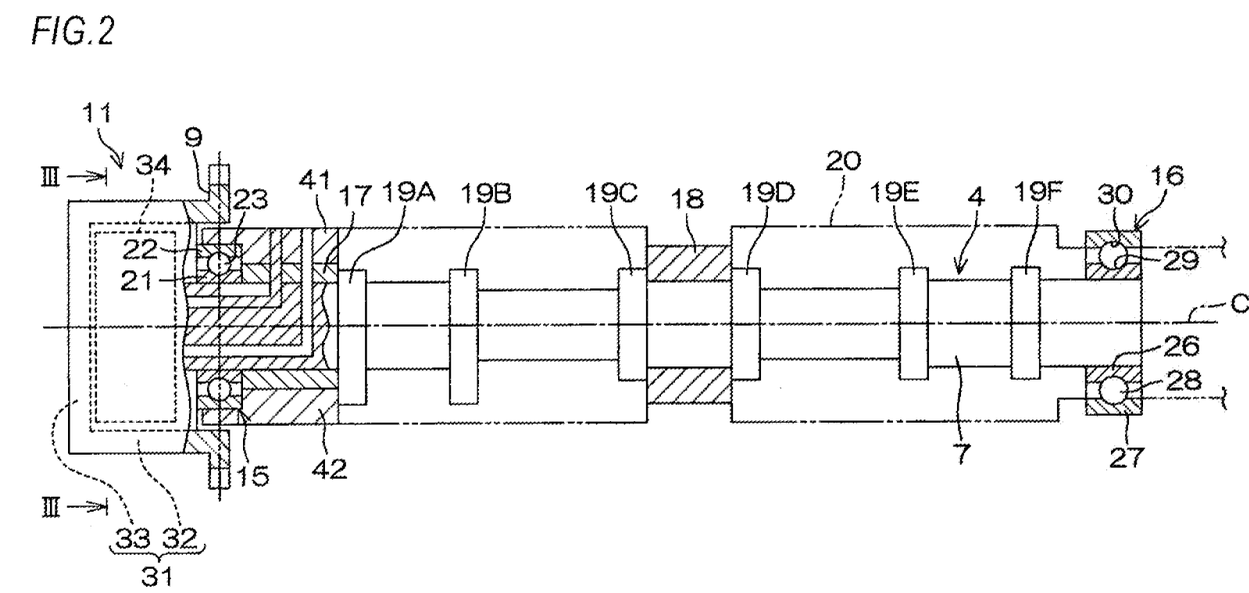
FIG. 2 is a sectional view showing the structure of the intake camshaft as shown in FIG. 1.

FIG. 2 is a sectional view showing the structure of the intake camshaft device 1 including the intake camshaft 4.

The intake camshaft device 1 is rotatably contained in a housing 20 of an engine for an automobile.

The intake camshaft device 1 includes the intake camshaft 4, a first rolling bearing 15 and a second rolling bearing 16 for rotatably supporting both ends of the intake camshaft 4, a first sliding bearing 17 and a second sliding bearing 18 for rotatably supporting the intake camshaft 4 between the first and second roiling bearings 15, 16. The first rolling bearing 15 and the first sliding bearing 17 are disposed adjacent to each other in an axial direction. The intake camshaft 4 has a rectilinear shaft body 7, and a plurality of cams 19A to 19F which are provided along an axial direction of this shaft body 7. The shaft body 7 is a shaft body in a columnar or cylindrical shape. The cams 19A to 19F are formed as separate members from the shaft body 7, and fixed to the shaft body 7 by external engagement. Although the shaft body 7 and the cams 19A to 19F are assembled into an integral unit, in the camshaft 4 as shown in FIG. 2, it is also possible to form the intake camshaft 4 integrally by casting.

In the intake camshaft device 1 as shown in FIG. 2, the six cams 19A to 19F in total, namely, the first cam 19A, the second cam 19B, the third cam 19C, the fourth cam 19D, the fifth cam 19E, and the sixth cam 19F are mounted in order from one side (a left side in FIG. 2). The first and second cams 19A, 19B are the cams for a first cylinder (not shown) of the engine, the third cam 19C is the cam for a second cylinder (not shown) of the engine, the fourth cam 19D is the cam for a third cylinder (not shown) of the engine, and the fifth and sixth cams 19E, 19F are the cams for a fourth cylinder (not shown) of the engine.

As the first rolling bearing 15, a deep groove ball bearing, for example, is employed. The first rolling bearing 15 includes an inner ring 21 which is externally fixed to the intake camshaft 4, and an outer ring 22 which is internally fixed to an inner periphery of the housing 20 of the engine. The inner ring 21 is provided with an inner ring raceway groove 24 (See FIG. 4) for allowing a plurality of rolling elements 23 to roll. The outer ring 22 is provided with an outer ring raceway groove 25 (See FIG. 4) for allowing a plurality of the rolling elements 23 to roll. The plurality of rolling elements 23 which are arranged in a row are interposed between the inner ring 21 and the outer ring 22.

As the second rolling bearing 16, a deep groove bail bearing, for example, is employed. The second rolling bearing 16 includes an inner ring 26 which is externally fixed to the intake camshaft 4, and an outer ring 27 which is internally fixed to an inner periphery of the housing 20 of the engine. The inner ring 26 is provided with an inner ring raceway groove 29 for allowing a plurality of rolling elements 28 to roll. The outer ring 27 is provided with an outer ring raceway groove 30 for allowing the plurality of rolling elements 28 to roll. The plurality of rolling elements 28 which are arranged in a row are interposed between the inner ring 26 and the outer ring 27.

Moreover, the first sliding bearing 17 is supported by a pair of retaining caps (a support member) 41, 42 in a semicircular shape, to be fixed to the housing 20. Not only the first sliding bearing 17 but also the first roiling bearing 15 are fixed and supported by a pair of these retaining caps 41, 42. The retaining cap 41 and the retaining cap 42 are connected to each other with a jig (not shown), in a state where the intake camshaft 4, the first sliding bearing 17 and the first rolling bearing 15 are damped between them. Because the two bearings, namely, the first rolling bearing 15 and the first sliding bearing 17 are supported using a pair of the retaining caps 41, 42, it is possible to reduce the number of components of the retaining cap.

The second sliding bearing 18 supports a part of the shaft body 7 between a mounting position of the third cam 19C and a mounting position of the fourth cam 19D.

Although the shaft body 7 is described as the columnar or cylindrical body in the above description, specifically, a part of the shaft body 7 between a mounting position of the second cam 19B and a mounting position of the third cam 19C, and a part of the shaft body 7 between a mounting position of the fourth cam 19D and a mounting position of the fifth cam 19E have a slightly smaller diameter than the other parts of the shaft body 7.

The VVT mechanism 11 includes a sprocket assembly 31 which functions as a housing of the sprocket 9 for the intake cam. The sprocket assembly 31 is commonly used as the housing of the sprocket 9 for the intake cam and the housing of the VVT mechanism 11. The sprocket assembly 31 is disposed so as to surround a part of the intake camshaft 4 at a forward side than the first rolling bearing 15 (a left side in FIG. 2). In other words, the VVT mechanism 11 (mainly, a rotor 34 which will be described below), the first rolling bearing 15, and the first sliding bearing 17 are arranged along the axial direction of the shaft body 7, in this order from a front side (the left side in FIG. 2). The sprocket assembly 31 has a bottomed cylindrical shape in which a backward end (a right side in FIG. 2) is opened. More specifically, the sprocket assembly 31 includes a peripheral wall part 32 in a cylindrical shape and a bottom face part 33 for closing a front end face (an end face at the left side in FIG. 2) of the peripheral wall part 32.

The sprocket 9 for the intake cam in an annular shape is provided on a back end face (a right end face in FIG. 2) of the peripheral wall part 32. The sprocket 9 for the intake cam may be integrally formed with the sprocket assembly 31, as shown in FIG. 2, or may be formed as a separate member. The sprocket 9 for the intake cam rotates around a center axis C of the intake camshaft 4. Teeth 71 of the sprocket 9 for the intake cam (See FIG. 3) are formed on an outer peripheral face of the sprocket 9 for the intake cam.

The sprocket assembly 31 has the bottomed cylindrical shape in its entirety in which the backward end (the right side in FIG. 2) is opened. The VVT mechanism 11 includes the rotor 34 which is contained in the sprocket assembly 31 so as to rotate around the center axis C. The rotor 34 is fixed to the intake camshaft 4 with a bolt (not shown). By driving the rotor 34 to rotate with hydraulic pressure of the engine, the VVT mechanism 11 varies a phase between the sprocket 9 for the intake cam and the intake camshaft 4 which is fixed by the rotor 34.

Figure 3:
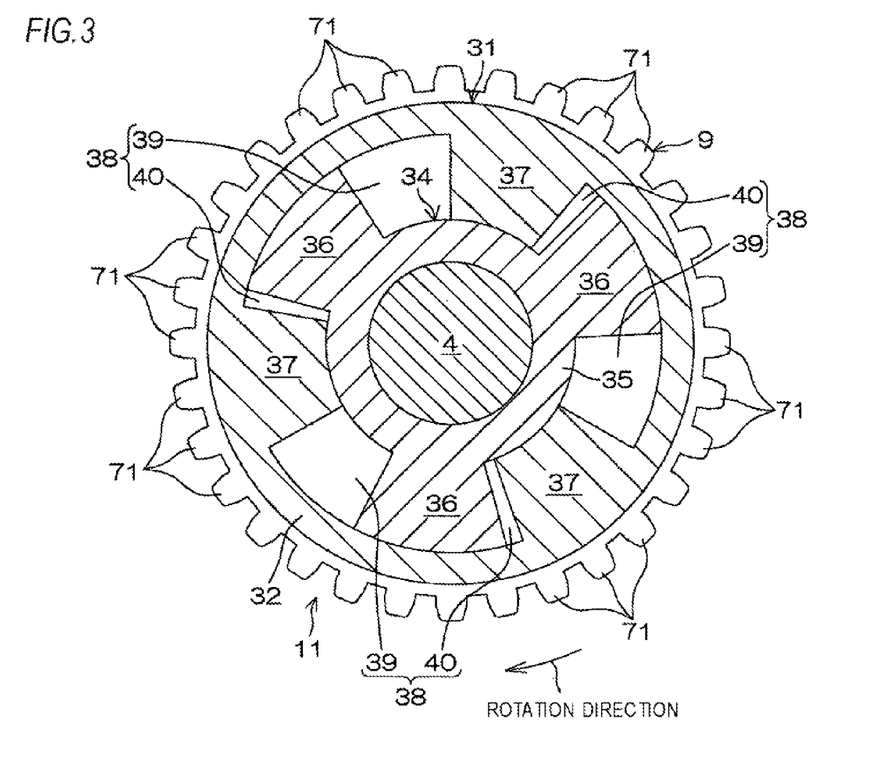
FIG. 3 is a sectional view as seen from a sectional plane III-III in FIG. 2.

FIG. 3 is a sectional view as seen from a sectional plane III-III in FIG. 2. The rotor 34 of the VVT mechanism 11 includes an annular part 35 which is positioned at a rotation center of the rotor 34 and fixed to the intake camshaft 4, and a plurality of (three, for example) vanes 36 which are formed in a sector shape on an outer periphery of the annular part 35.

The sprocket assembly 31 is provided with a plurality of projected parts 37 which are projected inwardly in a radial direction of the intake camshaft 4 from an inner peripheral face of the peripheral wall part 32 in the cylindrical shape, along an entire circumference of the peripheral wall part 32. In this state, respective inner peripheral faces of the projected parts 37 are in sliding contact with an outer peripheral face of the annular part 35. Recesses 38 are formed between a pair of the adjacent projected parts 37. The respective vanes 36 are contained in the respective recesses 38. In this state, outer peripheral faces of the respective vanes 36 are in sliding contact with the inner peripheral face of the peripheral wall part 32. Each of the recesses 38 is partitioned by each of the vanes 36 into two pressure rooms. Specifically, a hydraulic pressure room 40 at a lead angle side is formed in the recess 38, at an opposite side to the rotation direction of the intake camshaft 4. A hydraulic pressure room 39 at a lag angle side is formed in the recess 38 at a side of the rotation direction of the intake camshaft 4. Oil is respectively supplied to the hydraulic pressure room 40 at the lead angle side and the hydraulic pressure room at the lag angle side. The vanes 36 are rotated in the two directions around the center axis C of the intake camshaft 4, by an amount corresponding to a magnitude of hydraulic pressure of the oil which is supplied to these hydraulic pressure rooms 39, 40.

Figure 4:
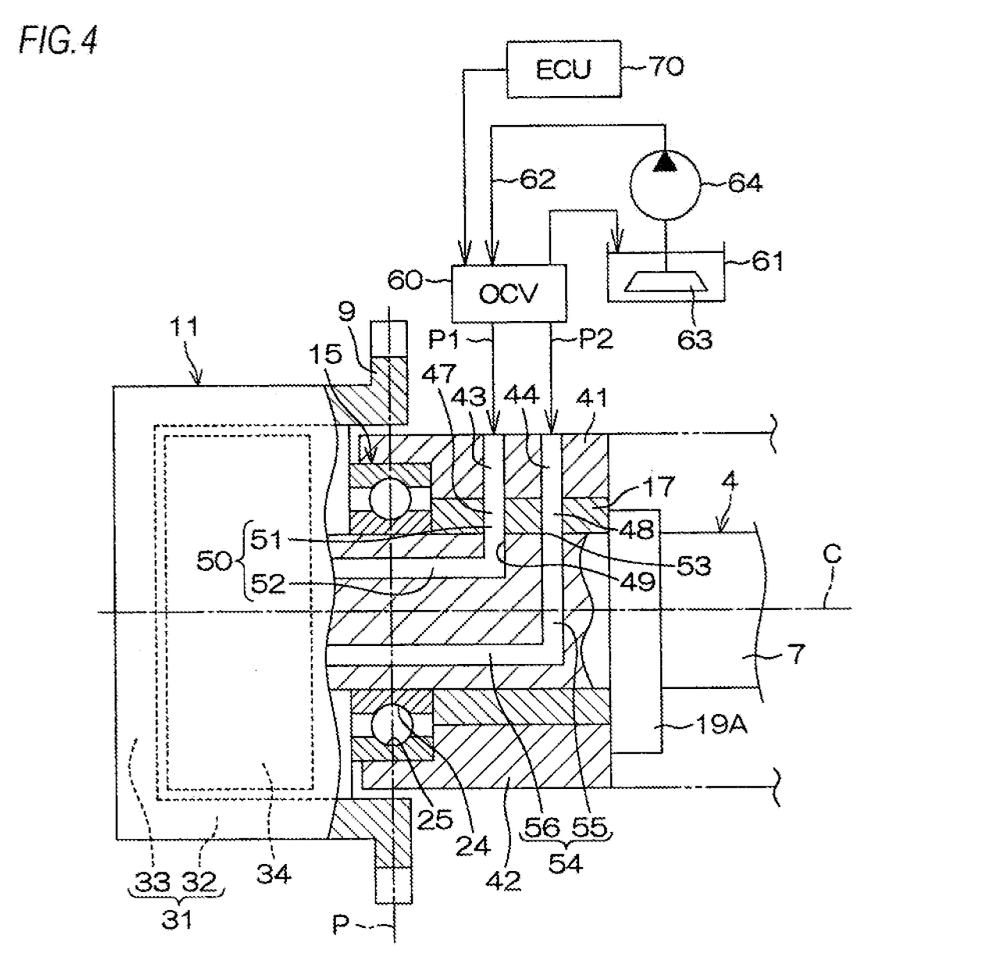
FIG. 4 is an enlarged sectional view showing a structure including a first rolling bearing, a first sliding bearing, and a retaining cap.

FIG. 4 is a sectional view showing, in an enlarged scale, the structure including the first rolling bearing 15, the first sliding bearing 17, and the retaining caps 41, 42. The invention will be further described below, appropriately referring to FIGS. 2 to 4.

As shown in FIG. 4, the first rolling bearing 15 is disposed in a same plane as the rotation plane of the sprocket 9 for the intake cam. In other words, the first rolling bearing 15 is positioned within a plane P (See FIG. 4) which is overlapped with the plurality of teeth 71 (See FIG. 3) in the axial direction, and perpendicular to the center axis C. The first sliding bearing 17 is disposed adjacent to the first rolling bearing 15 backward thereof in the axial direction (at the right side in FIG. 4).

One of the retaining caps 41 is provided with an oil flow passage 43 of a lead angle cap (an oil flow passage) so as to pass through inner and outer peripheral faces of the retaining cap 41. One end of a hydraulic pressure passage P1 at the lead angle side is connected to the oil flow passage 43 of the lead angle cap. This retaining cap 41 is also provided with an oil flow passage 44 of a lag angle cap (an oil flow passage) so as to pass through inner and outer peripheral faces of the retaining cap 41. One end of a hydraulic pressure passage P2 at a lag angle side is connected to the oil flow passage 44 of the lag angle cap.

The first sliding bearing 17 is provided with an oil passage 47 of a lead angle bearing (a flow port) passing through inner and outer peripheral faces of the first sliding bearing 17 in a radial direction, at a position corresponding to a position where the oil flow passage 43 of the lead angle cap is formed. The oil passage 47 of the lead angle bearing is formed along an entire area along a circumferential direction. Moreover, the first sliding bearing 17 is provided with an oil passage 48 of a lag angle bearing (a flow port) passing through the inner and outer peripheral faces of the first sliding bearing 17 in the radial direction, at a position corresponding to a position where the oil flow passage 44 of the lag angle cap is formed. The oil passage 48 of the lag angle bearing is formed along an entire area along the circumferential direction. The oil passage 48 of the lag angle bearing is offset from the oil passage 47 at the lead angle bearing, by 90 degree in the rotation direction around the center axis C.

A first oil flow port 49 at an outer peripheral side is formed on the outer peripheral face of the intake camshaft 4, at a position corresponding to the oil passage 47 of the lead angle bearing. Moreover, in a distal end part of the intake camshaft 4, there are formed first oil flow ports at a distal end side (not shown), at positions opposed to the respective hydraulic pressure rooms 40 at the lead angle side. Inside the intake camshaft 4, there is formed a shaft oil passage 50 at a lead angle side (a passage for oil flow) which interconnects the first oil flow port 49 at the outer peripheral side and the first oil flow ports at the distal end side. The shaft oil passage 50 at the lead angle side includes a first radial passage 51 extending in a radial direction from the first oil flow port 49 at the outer peripheral side, up to a predetermined first position near the center axis C of the intake camshaft 4, and a first axial passage 52 interconnecting an end of the first radial passage 51 (the end close to the center axis) and the first oil flow ports at the distal end side, and extending along the axial direction.

A second oil flow port 53 at an outer peripheral side is formed at a position corresponding to the oil passage 48 of the lag angle bearing. Moreover, in the distal end part of the intake camshaft 4, there are formed second oil flow ports at a distal end side (not shown), at respective positions opposed to the hydraulic pressure rooms 39 at the lag angle side. Inside the intake camshaft 4, there is formed a shaft oil passage 54 at a lag angle side (a passage for oil flow) which interconnects the second oil flow port 53 at the outer peripheral side and the second oil flow ports at the distal end side. The shaft oil passage 54 at the lag angle side includes a second radial passage 55 extending in a radial direction from the second oil flow port 53 at the outer peripheral side, up to a predetermined second position near the center axis C of the intake camshaft 4, and a second axial passage 56 interconnecting an end of the second radial passage 55 (the end close to the center axis) and the second oil flow ports at the distal end side, and extending along the axial direction.

Because the first sliding bearing 17 is disposed adjacent to the first rolling bearing 15, the first sliding bearing 17 having the bearing oil passages 47, 48 is positioned near the VVT mechanism 11 in the axial direction. In this manner, it is possible to reduce a distance in the axial direction between the shaft oil passages 50 and 54 which are formed in the shaft body 7.

As described above, the one end of the hydraulic pressure passage P1 at the lead angle side is connected to the part where the oil flow passage 43 of the lead angle cap is opened on the outer peripheral face of the retaining cap 41. Moreover, the one end of the hydraulic pressure passage P2 at the lag angle side is connected to the part where the oil flow passage 44 of the lag angle cap is opened on the outer peripheral face of the retaining cap 41.

The other end of the hydraulic pressure passage P1 at the lead angle side and the other end of the hydraulic pressure passage P2 at the lag angle side are respectively connected to an oil control valve (hereinafter, referred to as "OCV") 60. Moreover, an upstream end and a downstream end of a circulating pipe 62 in which the oil circulates are connected to an oil pan 61 for stocking the oil which is supplied to the hydraulic pressure rooms 39, 40. The circulating pipe 62 is returned to the oil pan 61 via the OCV 60. An oil pump 64 for sucking up the oil which is stocked in the oil pan 61 is disposed in a middle of the circulating pipe 62. In addition, a filter 63 is disposed at an upstream end of the circulating pipe 62.

The OCV 60 is provided with a casing having a plurality of ports. To these ports, the one end of the hydraulic pressure passage P1 at the lead angle side, the one end of the hydraulic pressure passage P2 at the lag angle side, a downstream end of the upstream part of the circulating pipe 62, and an upstream end of the downstream part of the circulating pipe 62 are respectively connected. A spool (not shown) having a valve body is movably contained in the casing. Moreover, a driving part including an electromagnetic solenoid, for example, for moving the spool is incorporated inside the casing. The driving part is controlled by an ECU 70 which comprehensively controls an operation of the engine.

When the oil pump 64 is driven with the operation of the engine, the oil which is stocked in the oil pan 61 is sucked into the oil pump 64 through the filter 63, and at the same time, pressured by the oil pump 64 to be discharged. Then, the oil which has been discharged is selectively sent, under pressure, to a downstream part of either of the hydraulic pressure passage P1 at the lead angle side, the hydraulic pressure passage P2 at the lag angle side, and the circulating pipe 62.

On this occasion, while the ECU 70 stops the power supply to the driving part, an interior of the hydraulic pressure passage P1 at the lead angle side is communicated with an interior of the upstream part of the circulating pipe 62, and at the same time, an interior of the hydraulic pressure passage P2 at the lag angle side is communicated with an interior of the downstream part of the circulating pipe 62. As the results, the oil which has been discharged from the oil pump 64 is supplied to the hydraulic pressure room 40 at the lead angle side through the upstream part of the circulating pipe 62, the hydraulic pressure passage P1 at the lead angle side, the oil flow passage 43 of the lead angle cap, the oil passage 47 of the lead angle bearing, and the shaft oil passage 50 at the lead angle side. Moreover, the oil inside the hydraulic pressure room 39 at the lag angle side is returned to the oil pan 61 through the shaft oil passage 54 at the lag angle side, the oil passage 48 of the lag angle bearing, the oil flow passage 44 of the lag angle cap, the hydraulic pressure passage P2 at the lag angle side, and the downstream part of the circulating pipe 62.

While the ECU 70 drives the driving part at a duty ratio of 100%, the interior of the hydraulic pressure passage P1 at the lead angle side is communicated with the interior of the downstream part of the circulating pipe 62, and at the same time, the interior of the hydraulic pressure passage P2 at the lag angle side is communicated with the interior of the upstream part of the circulating pipe 62. As the results, the oil which has been discharged from the oil pump 64 is supplied to the hydraulic pressure room 39 at the lag angle side through the downstream part of the circulating pipe 62, the hydraulic pressure passage P2 at the lag angle side, the oil flow passage 44 of the lag angle cap, the oil passage 48 of the lag angle bearing, and the shaft oil passage 54 at the lag angle side. Moreover, the oil inside the hydraulic pressure room 40 at the lead angle side is returned to the oil pan 61 through the shaft oil passage 50 at the lead angle side, the oil passage 47 of the lead angle bearing, the oil flow passage 43 of the lead angle cap, the hydraulic pressure passage P1 at the lead angle side, and the upstream side of the circulating pipe 62.

When the oil is supplied to the hydraulic pressure room 40 at the lead angle side, and at the same time, the oil inside the hydraulic pressure room 39 at the lag angle side is discharged from the hydraulic pressure room 39, the respective vanes 36 (the rotor 34) are relatively rotated in the same direction as the rotation direction of the intake camshaft 4. According to the rotation of the vanes 36, the hydraulic pressure room 40 at the lead angle side is expanded, and at the same time, the hydraulic pressure room 39 at the lag angle side is contracted. In this manner, the rotation phase of the intake camshaft 4 is advanced with respect to the sprocket 9 for the intake cam thereby to accelerate the valve timing.

On the other hand, When the oil is supplied to the hydraulic pressure room 39 at the lag angle side, and at the same time, the oil inside the hydraulic pressure room 40 at the lead angle side is discharged from the hydraulic pressure room 40, the respective vanes 36 (the rotor 34) are relatively rotated in the same direction as the rotation direction of the intake camshaft 4. According to the rotation of the vanes 36, the hydraulic pressure room 39 at the lag angle side is expanded, and at the same time, the hydraulic pressure room 40 at the lead angle side is contracted. In this manner, the rotation phase of the intake camshaft 4 is retarded with respect to the sprocket 9 for the intake cam thereby to decelerate the valve timing.

As described above, according to this embodiment, the intake camshaft 4 is ratably supported by the plurality of bearings 15 to 18 including the first rolling bearing 15, and the sliding bearing 17 which is disposed adjacent to the first rolling bearing 15 in the axial direction. A chain load of the timing chain 6 which is wound around the sprocket 9 for the intake cam is intensively exerted on a part of the intake camshaft 4 in a plane including the plurality of teeth of the sprocket 9 for the intake cam, and perpendicular to the center axis C of the intake camshaft 4. The part of the intake camshaft 4 which mainly bears the chain load of the timing chain 6 is supported by the first rolling bearing 15 which has the smaller rotation sliding friction, and therefore, if is possible to achieve the lower torque of the intake camshaft device 1.

Moreover, the first sliding bearing 17 is disposed adjacent to the first rolling bearing 15. Because the intake camshaft 4 is supported by both the first rolling bearing 15 and the first sliding bearing 17, the lower torque drive of the intake camshaft device 1 can be achieved more effectively.

As the results, it is possible to realize the lower torque drive of the intake camshaft 4, without complicating the structure of the intake camshaft device 1. In this manner, fuel efficiency of the automobile can be enhanced.

Although the one embodiment according to the invention has been described hereinabove, it is also possible to carry out the invention in other modes.

For example, although the deep groove ball bearing is adopted as the first rolling bearing 15, other radial ball bearings such as an angular ball bearing may be also adopted. Alternatively, it is also possible to adopt a roller bearing instead of the ball bearing.

Moreover, the oil flow passages 43, 44 of the cap may be provided in the retaining cap 42, or may be provided one by one respectively in the retaining caps 41 and 42.

In case where the timing chain 6 is adopted as the transmitting member, the sprocket 9 (the sprocket for the intake cam) is adopted as the gear. However, in case where a timing belt is adopted as the transmitting member, it is possible to adopt a timing pulley, for example, as a rotary member corresponding to the gear.

Further, it is also possible to apply this invention to the exhaust camshaft 5. Specifically, the exhaust camshaft 5 may be supported by a rolling bearing which is arranged on a same plane as a rotation plane of a sprocket for an exhaust cam in the exhaust camshaft 5, and the first sliding bearing 15 which is disposed adjacent to the rolling bearing in the axial direction.

Furthermore, various modifications in design can be made within a scope of those features which are described in the claims.

This invention is based on Japanese Patent Application No. 2010-198015 filed on Sep. 3, 2010, the contents of which are herein incorporated by reference.

DESCRIPTION OF THE REFERENCE NUMERALS AND SIGNS

1 Intake camshaft device (camshaft device)
4 Intake camshaft (camshaft)
6 Timing chain (transmitting member)
7 Shaft body (shaft body)
9 Sprocket for intake cam
11 VVT mechanism (valve timing mechanism)
15 First rolling bearing
16 Second rolling bearing
17 First sliding bearing
18 Second sliding bearing
19A First cam
19B Second cam
19C Third cam
19D Fourth cam
19E Fifth cam
19F Sixth cam
32 Peripheral wall part
41 Retaining cap (support member)
42 Retaining cap (support member)
43 Oil flow passage of lead angle cap (oil flow passage)
44 Oil flow passage of lag angle cap (oil flow passage)
47 Oil passage of lead angle bearing (flow port)
48 Oil passage of lag angle bearing (flow port)
50 Shaft oil passage at lead angle side (passage for oil flow)
54 Shaft oil passage at lag angle side (passage for oil flow)
71 Tooth
C Center axis

The invention claimed is:

1. A camshaft device comprising:
a camshaft including a shaft body, and a plurality of cams which are provided along an axial direction of the shaft body;
a gear having a plurality of teeth, and mounted on the camshaft so as to rotate around a center axis of the camshaft; and
a plurality of bearings rotatably supporting the camshaft, wherein
a transmitting member transmitting driving power is wound around the gear,
the bearings include a roiling bearing which is provided in a plane overlapped with the plurality of teeth in the axial direction and perpendicular to the center axis, and a sliding bearing which is provided adjacent to the roiling bearing in the axial direction.

2. The camshaft device as claimed in claim 1, further comprising:
a valve timing mechanism of hydraulic type for varying phases of the gear and the camshaft, wherein
the gear further includes a peripheral wall part in a cylindrical shape which is provided at an opposite side to the sliding bearing with respect to the rolling bearing, and concentric with the center axis,
the plurality of teeth are provided on an end face of the peripheral wall part at one side in the axial direction, and
the sliding bearing is formed with flow ports for supplying and discharging an oil to the valve timing mechanism through the shaft body, so as to pass through the sliding bearing in a radial direction.

3. The camshaft device as claimed in claim 2, further comprising:
a support member supporting both the rolling bearing and the sliding bearing, wherein
the support member is formed with oil flow passages for supplying and discharging the oil to the valve timing mechanism through the shaft body and the flow ports.

* * * * *